United States Patent [19]
Sohre

[11] 4,336,039
[45] Jun. 22, 1982

[54] GEOTHERMAL TURBINE
[76] Inventor: John S. Sohre, One Lakeview Cir., Beaver Lake, Ware, Mass. 01082
[21] Appl. No.: 841,652
[22] Filed: Oct. 13, 1977
[51] Int. Cl.³ ............................................. B01D 51/08
[52] U.S. Cl. ........................................ 55/277; 55/407; 239/214.21; 239/289; 415/63; 415/212 R; 415/213 R; 415/215
[58] Field of Search .......................... 55/277, 400–408, 55/DIG. 22; 415/80, 81, 206, 212 R, 213 R, 215 R, 63; 239/289, 214.21

[56] References Cited
U.S. PATENT DOCUMENTS

| | | | |
|---|---|---|---|
| 879,476 | 2/1908 | Krell | 415/212 X |
| 1,889,816 | 12/1932 | White | 415/213 R X |
| 2,845,216 | 7/1958 | Sallou | 415/213 R X |
| 3,228,342 | 1/1966 | Page | 415/212 X |
| 3,234,716 | 2/1966 | Sevin et al. | 55/407 X |
| 3,620,642 | 11/1971 | Studebaker et al. | 415/213 R X |
| 3,804,335 | 4/1974 | Sohre | 239/289 |
| 3,879,152 | 4/1975 | Eskeli | 415/80 |
| 3,930,744 | 1/1976 | Theis | |
| 3,968,935 | 7/1976 | Sohre | 239/289 |

Primary Examiner—Richard L. Chiesa
Attorney, Agent, or Firm—Fishman and Van Kirk

[57] ABSTRACT

A turbine for the generation of energy from geothermal sources including a reaction water turbine of the radial outflow type and a similar turbine for supersonic expansion of steam or gases. The rotor structure may incorporate an integral separator for removing the liquid and/or solids from the steam and gas before the mixture reaches the turbines.

15 Claims, 4 Drawing Figures

GEOTHERMAL TURBINE

BACKGROUND OF THE INVENTION

In utilizing geothermal energy for power the main problem is that the hot pressurized steam is accompanied by quantities of equally hot pressurized water that cannot be utilized efficiently in a steam turbine. Therefore the power plant is most efficient if the steam and water can be separated and discharged through different turbines designed particularly for water and steam respectively. The steam and water mixture may also carry solids and salts as well as corrosive gases causing excessive wear on the turbines as well as serious corrosion of major components of the power plant.

The radial outflow turbine, exemplified long ago by the Hero engine, in its modern conceptions has the drawbacks of capacity by reason of the limited nozzle arrangement, and low efficiency since the power fluid is accelerated circumferentially to the velocity of the rotor during its travel outwardly to the nozzles and no advantage is obtained from this acceleration. The high circumferential speed needed to obtain effective efficiencies in a reaction turbine results in a high power loss. These types of turbine also require a clean fluid as the power fluid to avoid damage to rotor and nozzles, and geothermal energy requires separation of the fluid before effective use in these devices.

The alternative to the Hero type of turbine is the multistage axial flow turbine. The required sophisticated installation in conjunction with the sophisticated turbine causes years of delay between conception and operation of this type of turbine in a geothermal power plant. This type of turbine has the particular objection of the risk of blading failures and of erosion resulting from the contaminated wet steam. The presence of large amounts of water in such turbines could be disastrous.

SUMMARY OF THE INVENTION

The principal feature of the present invention is a reaction radial outflow turbine requiring no stator nozzles and having contoured supersonic nozzles and also so designed as to minimize tangential acceleration of the power fluid in its radial movement to the reaction nozzles. Another feature is a turbine which is of the type that can operate efficiently on steam or a multiphase fluid. Another feature is the incorporation of both a steam and a water turbine rotor with an integral separator that divides the steam and water between the two rotors.

According to this invention, the turbine rotor through which the fluids are discharged is a reaction type in which the periphery of the rotor carries a row of contoured supersonic nozzles capable of allowing the hot pressurized water to flash into steam. This wheel or rotor is preferably constructed to accommodate either water or steam or a mixture of both, depending on the proportions of water and steam in the power fluid.

A more sophisticated installation is a two wheel rotor construction in which the water discharges through a smaller diameter wheel and the steam discharges through a larger diameter wheel, the rotor having an integral centrifuge just upstream of the water wheel to divide the power fluid into water, which is diverted to the water wheel, and steam, which passes to the steam wheel and through the reaction steam nozzles. These wheels are coaxially positioned on the same shaft. Any solids, sludge and the like is centrifuged with the water and passes through the water turbine.

DESCRIPTION OF THE PREFERRED EMBODIMENTS

Figure 1:
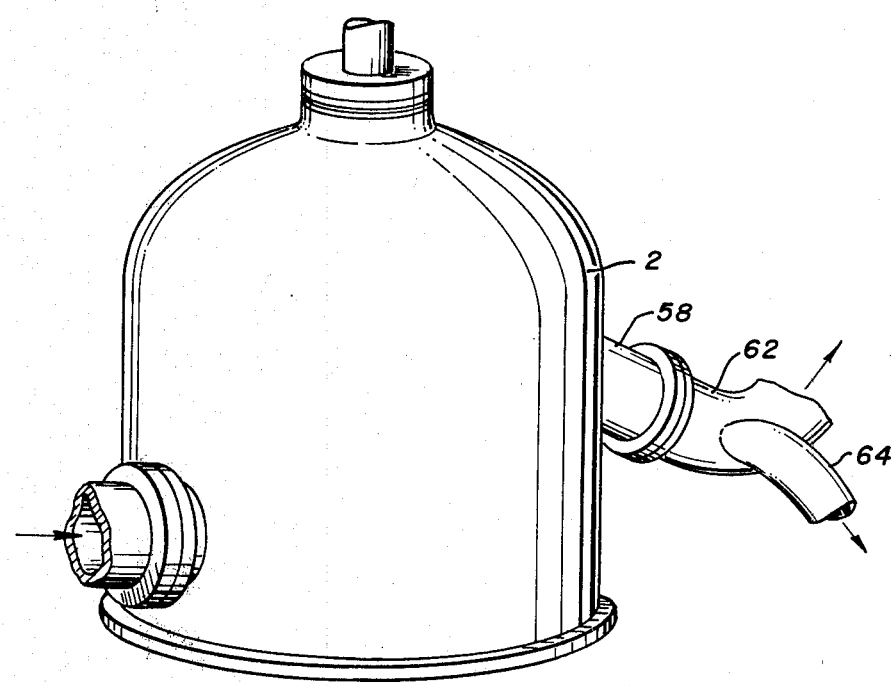
FIG. 1 is an elevation of a turbine incorporating the invention.

Referring to the drawings, the turbine is shown as being mounted on a vertical axis so that the casing 2 is mounted on a base 3 and carries near the top a seal 4 (FIG. 2) surrounding the shaft 6 and a bearing 8 above the seal. The generator shaft 10 to which the turbine shaft is attached provides a stabilizing bearing, not shown, for stabilizing the turbine rotor. Alternatively, the turbine rotor may be overhung from the generator shaft.

The power fluid enters the casing through an inlet 12 near the base of the casing that connects by a duct 13 with a centrally positioned opening 14 located directly below the end of the shaft to discharge into the water turbine rotor 16 and the steam turbine rotor 18 coaxially positioned on the shaft. The water turbine wheel or rotor is below the steam turbine rotor and has its annular inlet 20 just above the opening 14. The annular inlet passage 20 is defined by a conical end element 22 on the axis of the shaft forming the inner wall and a cooperating outer wall 24 gradually diverging from the inner wall. This outer wall is supported on the end of the shaft by guide vanes or struts 26. This outer wall near its downstream end is nearly perpendicular to the axis of the shaft as shown. The annular inlet passage thus increases in radius in a downstream direction.

The opposite wall 28 of this water turbine rotor is also nearly perpendicular to the shaft axis, the two walls converging slightly in the direction of flow of the fluid outwardly between the walls to define a converging passage. The outer ends of these two walls are formed to provide between them a row of reaction supersonic nozzles 29. These nozzles are constructed to divert the discharging fluid in a direction substantially tangential to the periphery of the wheel as will be apparent. One example of a nozzle of this type is described in U.S. Pat. No. 3,968,935. This type of nozzle will permit efficient supersonic expansion of steam or flashing of boiling pressurized water. Thus, this nozzle is effective for the water turbine rotor whether or not steam is admitted with the water in the rotor. This form of nozzle will be described in detail later.

The passage 20, the inner wall of which is the surface of the cone 22, increases in diameter in the direction of fluid flow therein and the result is a centrifugal effect on the fluids (and solids) in the fluid stream. The heavier materials, the water and solids are caused to move by this action in a direction toward the water turbine nozzles as will be apparent. The surface 28 of the water rotor extends radially inward beyond the imaginary surface formed as an extension of the cone such that any water and/or solids having a radial component of motion established by the conical surface and the direction of the passage 20 will be diverted into the water rotor. The steam being lighter is diverted inwardly into the steam rotor inlet.

Above the conical portion of the shaft, that serves with the vanes 26 and the cooperating wall surface as a centrifuge to separate the water and solids from the steam in the power fluid and divert the water and solids into the water rotor, the shaft has an axially curved wall 30 forming the concave inner surface of the inlet passage 32 to the steam turbine wheel or rotor. The outer wall 34 of this passage is convex and is an inward and upward continuation of the wall 28 of the water rotor. This passage 32 curves slightly toward the axis of the shaft then turns outwardly to a generally radial direction forming a radial passage 36 terminating in nozzles 38. These nozzles are positioned between the outer ends of the wall 34 and an opposing wall 40 formed by a generally radially extending disk on the shaft.

Although in many instances the discharge from the rotors would be in a plane perpendicular to the axis of the shaft, in this concept the turbine rotor passages are contoured to position the nozzle so that the discharge is at a slight angle to the perpendicular, being in fact almost parallel to the domed casing at this point. This direction of discharge makes possible a washing action of the discharging fluid over the surface of the casing to remove any sludge collecting thereon. The same is true of the nozzles for the water rotor although the "out-of-perpendicular" effect is less as shown since the periphery of the water rotor is not closely adjacent to the casing.

For the same pressure ratio between inlet and exhaust a water turbine needs a smaller diameter than a steam turbine because of the significant difference in discharge velocities. Thus, the water rotor is shown as a smaller diameter than the steam rotor. Since it is inefficient to discharge water and steam together in a single wheel, it is most effective to have the two-wheel rotor construction described with the integral centrifugal separator to divide the fluid stream between the rotors.

Figure 3:
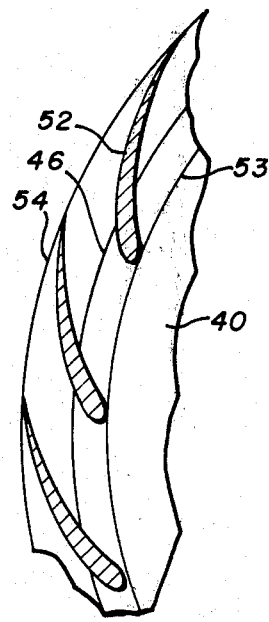
FIG. 3 is a sectional view along line 3—3 of FIG. 2.
Figure 2:
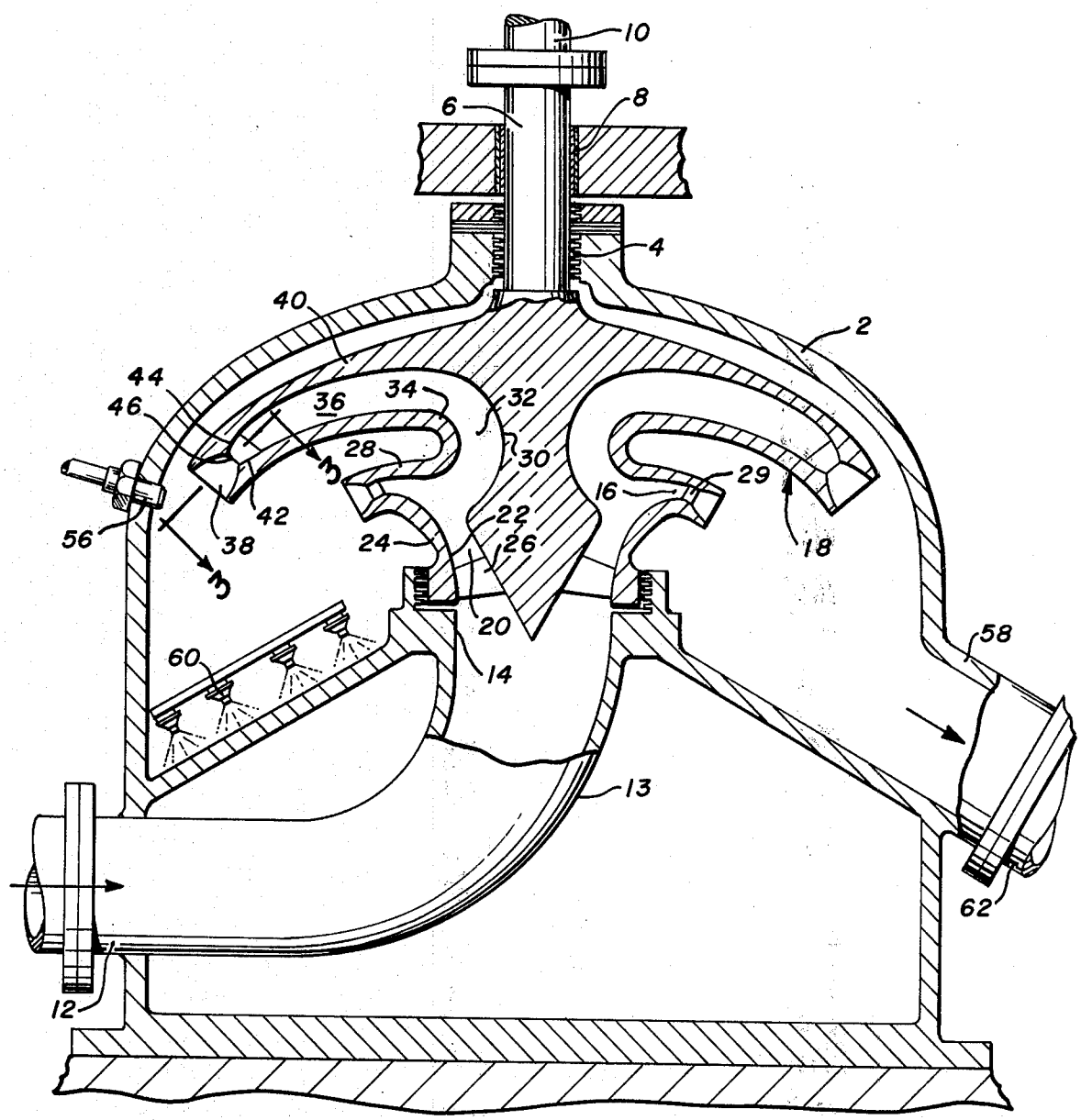
FIG. 2 is a vertical sectional view through the turbine of FIG. 1.

An example of a nozzle construction to produce high efficiency in both rotors is shown in the steam rotor of FIG. 2 and the sectional view of FIG. 3. The particular advantages of this form of nozzle are clearly described in U.S. Pat. No. 3,968,935 above referred to and a similar construction nearly as effective in this arrangement is described in U.S. Pat. No. 3,804,335. As shown in these figures, the nozzle 38 has opposed wall surfaces 42 and 44 which converge toward each other from a blending with the surfaces of walls 34 and 40 to a nozzle throat 46. Downstream from the throat the walls 48 and 50 diverge to form the supersonic expansion volume for the power fluid. These walls are shown to diverge more rapidly close to the throat and less rapidly later to accommodate the shock waves and the expansion of the fluid or fluids.

The circumferential pattern of these converging and diverging surfaces is broken up by axially extending streamlined or airfoil shaped vanes 52, FIG. 3, extending between the walls 34 and 40 as shown to direct the flow into a direction tangential to the periphery of the wheel thereby obtaining the most thrust on the rotor from the discharge of the fluid through the nozzles. The shape of these vanes is dependent on the pressure drop through the nozzles, essentially, the best airfoil shape is selected to produce a minimum of impedance to the flow while guiding the flow into the desired tangential direction.

These vanes 52 preferably extend radially from the upstream ends of the convergent surfaces 42 and 44, represented by the line 53, FIG. 3, past the throat 46 and substantially to the outer periphery of the rotor, represented by the line 54, FIG. 3. Although the vanes are shown as airfoil in shape, the term is used for either a subsonic or supersonic airfoil dependent upon the velocity of the fluid approaching and through the nozzles. The particular contours and lengths of the convergent surfaces 42 and 44 and of the divergent wall surfaces 48 and 50 will be determined in any specific rotor construction by the pressure drops across the nozzles as well as the mass of the particular fluid. Obviously for water, flashing in part into steam as it flows into and through the nozzle, the contours would be different from the contours for the steam nozzles on the steam wheel.

Both rotor elements are shown as having no structure extending across the flow passages as the power fluid moves outwardly in the rotors until the fluid reaches the nozzles. It is desirable to allow the fluid to move radially outward in these passages without any tangential acceleration of the fluid. The prior art has tangentially accelerated the driving fluid from standstill (pure radial flow) to the circumferential velocity of the rotor while the fluid is flowing through radial guide passages in the rotor to the nozzles. Such acceleration consumes considerable energy particularly in high speed rotors since the work to accelerate the fluid increases as the square of the circumferential velocity. Further, in a pure reaction turbine, of the type of this invention, high circumferential rotor speeds are required in order to obtain suitable operating characteristics and efficiencies that would be superior to conventional turbines.

Figure 4:
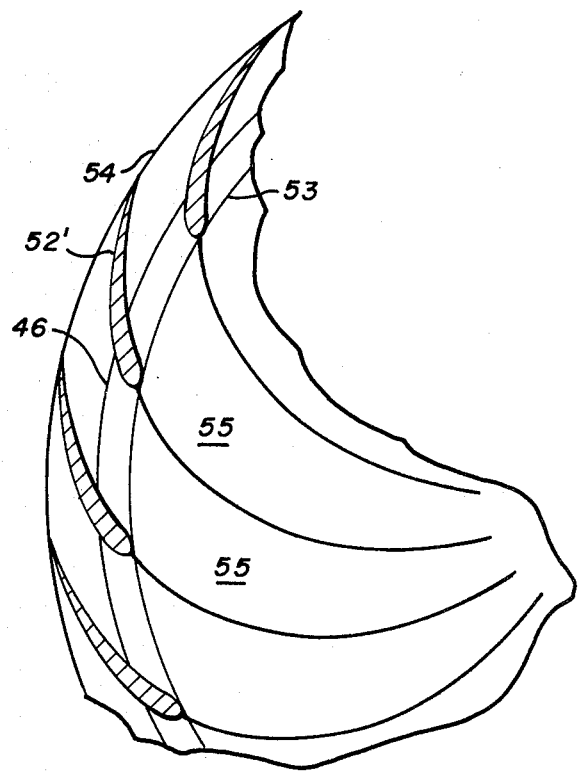
FIG. 4 is a sectional view similar to FIG. 3 of a modification.

It may be desirable, to assure a minimum of tangential acceleration of the fluids in the rotors to provide curved guide vanes 55, FIG. 4, extending upstream of and in alignment with the nozzle vanes, with the passages 56 established between these vanes contoured in relation to wheel velocity and fluid velocity in the wheel so that the flow in these passages will be essentially radially of the wheel. Such passages reduce any tangential acceleration resulting from boundary layer effects and assure entry of the fluid into the nozzle free of any tangential velocity. Such vanes may extend inwardly for most of the radial flow or may be positioned in only the outer half of the radial flow. The geometry of these spiral like vanes is determined by the area profile in the axial plane and the proportions of the vanes would be determined from the radial velocity profile. Although these guide vanes are shown as aligning directly with the nozzle vanes 52' and equal in number, it may be desirable to use less guide vanes, for example one for each second nozzle vane. It should be understood that in many installations such guide vanes would be entirely unnecessary. The prime purpose is to keep to a minimum any tangential acceleration of the power fluid. Where highest performance is not of prime importance, the omission of these guide vanes would reduce the development and production costs of the overall turbine.

One particular advantage of the present arrangement is that the capacity of either rotor is readily varied by adjusting the spacing of the opposite walls of the rotor. This may be accomplished by lengthening or shortening the axially extending vanes and the turbine rotor is thus adaptable to the quantity of geothermal power fluid and/or to the percentage of water in the fluid.

The exhaust casing can readily become a barometric condenser providing improved efficiency. This is accomplished essentially by spraying water into the casing through a series of nozzles 56 positioned in the casing wall and diverting fluid into the steam discharging from the periphery of the steam rotor. With such an arrangement and adequate valving in the outlet 58 for the exhaust chamber of the casing, such valving and/or pumps would, in conjunction with the cooling spray of water, lower the pressure in the exhaust chamber well below atmospheric.

The outlet 58 is located at the lowest point of the exhaust chamber and desirably slants downwardly therefrom as shown to encourage the outflow of sludge collecting in the chambers. This sludge may normally be washed out by the flow of water from the chamber. The discharge of the sludge may be encouraged by one or more racks of spray nozzles 60 that will discharge sprays of water into the sludge collecting at the base of the chamber and wash it along with the water from the turbine out of the chamber.

Although the turbine construction is described and shown on a vertical axis it is obviously well adapted for operation on a horizontal axis. In either event the solids carried with the water into the water wheel will be washed along with the water through the nozzles and because of the volume and temperature of the water and its rate of flow, should not be deposited detrimentally on the rotor.

It is expected that as the water discharges through the nozzles in the periphery of the rotor a significant amount will flash into steam as a result of the rapid reduction in pressure as the water is discharged through the nozzle and because of the high pressure and temperature of the water upstream of the nozzles. These nozzles are adapted to accommodate this flashing into steam and there is no significant loss in efficiency.

In operation, as the geothermal fluid enters the device it is under high pressure and at a high temperature and consists of water, steam and/or gases and solids (e.g. soil particles and salts), this mixture being extremely corrosive, erosive and prone to form deposits. This fluid enters the rotor structure and impinges on the conical end of the shaft. As the solids and water are given a radial component of motion by this conical surface, they continue in such a radial direction as to enter the water rotor being further radially diverted by the wall 28 of the water wheel to be discharged through the nozzles in the periphery of the wheel. The flow in the separator still has only a small tangential component flowing in essentially a radial direction so little energy is lost by circumferential acceleration. The fluid flows through the nozzles, being accelerated to supersonic velocity, and is discharged in a generally tangential direction for obtaining the greatest possible energy from the fluid.

The remaining fluid, consisting of steam and gas, not having been diverted into the water rotor, enters the steam rotor and flows radially outward in the rotor to enter and be discharged through the peripheral nozzles, the discharge also being in a tangential direction for best efficiency. As in the water rotor, the fluid motion within the rotor is almost entirely radial, there being no structure in the gas path therein to cause any significant tangential or circumferential acceleration.

The exhaust from both rotors is collected in the exhaust chamber and discharged therefrom through the outlet. Any sludge deposited from the fluids in the exhaust chamber is flushed out as above described. It is essential to note that in most geothermal installations the geothermal fluid to be used for supplying energy is a fairly uniform mixture of steam, water and solids. The ratio of water to steam may vary among installations but in any one installation it is expected that the ratio of water to steam is nearly enough constant so that properly sized steam and water rotors based on this ratio will operate at high efficiency over the relatively small changes in ratio that may occur.

Although the device is described with two turbine rotors in tandem it may well be desirable in many installations to use only a single rotor. Thus where the ratio is a relatively low proportion of the liquids (and solids) it may be advantageous to use only a single rotor, allowing the small amount of liquid (water) to go through the steam turbine. In this event it would be expected that much of the water would flash into steam in passing through the nozzles. Similarly if water is the high ratio fluid and steam is present only in a small amount, the single rotor would be sized for a water turbine and the small proportion of steam would pass with the water through this single rotor. It is important to note that in any of these installations, the turbine is desirably a pure reaction turbine of the radial outflow type requiring no stator vanes and being equipped, as above noted, with supersonic nozzles contoured so as to allow flashing of the pressurized water into steam and so as to develop the highest possible efficiency in the turbine. An example of such nozzles is above described. This use in the periphery of a radial outflow turbine is new in this environment where the flow reaching the nozzles is almost entirely radial, having no significant tangential motion within the rotor.

As shown in FIG. 1, the effluent discharging from the casing 2 through outlet duct 58 may be separated into its gaseous and liquid components in a connecting conduit 62 having a branch conduit 64 on the underside thereof. Liquids and solids separate out by gravity in the conduit 62 and flow down through the branch conduit into a collecting device, not shown. Steam and/or gas from the device discharges through conduit 62 either to a stack or another collector where it may be washed, condensed or otherwise treated.

While preferred embodiments have been shown and described, various modifications and substitutions may be made thereto without departing from the spirit and scope of the invention. Accordingly, the present invention has been described by way of illustration and not limitation.

What is claimed is:
1. A geothermal energy turbine comprising:
   a radial outflow rotor having contoured opposed walls, said rotor being mounted for rotation about an axis;
   means for delivering geothermal fluid to said rotor in a direction of absolute velocity substantially radial with respect to said axis;
   a plurality of reaction nozzles between said opposed walls, said nozzles being located in a row around the periphery of said radial outflow rotor and being positioned to discharge fluids substantially tangentially of the rotor periphery; and
   curved quide vanes extending inwardly from said nozzles toward said delivering means whereby the fluid will be restrained from rotation with the rotor.

2. A turbine as in claim 1 in which the nozzles are formed by airfoil vanes extending between the opposed walls and cooperating contoured surfaces on the opposed wall surfaces to form a convergent-divergent nozzle.

3. A geothermal fluid turbine rotor including:
two rotor wheels, one for steam and one for water;
each wheel having a row of supersonic nozzles on its periphery; and
a separator in the rotor for diverting water into the water wheel and steam to the steam wheel.

4. A turbine rotor as in claim 3 in which the separator includes:
a conical element on the axis of the rotor; and
a cooperating surrounding wall element forming an annular passage increasing in radius in a downstream direction and serving as a centrifuge to divert water radially outwardly into the water rotor.

5. A turbine rotor as in claim 4 in which the water wheel has opposed wall elements between which the water flows radially outward to the nozzles and an extension of said surrounding wall element is one of the opposed walls.

6. A turbine rotor as in claim 3 in which:
each rotor wheel has opposed wall elements defining between them a flow path for fluids to the nozzles located at the periphery of these walls.

7. A turbine rotor as in claim 6 in which, in at least one wheel, the nozzles are formed by nozzle vanes extending between said wall elements and the opposed wall surfaces at these nozzle vanes are contoured to form, with the vanes, convergent-divergent nozzles arranged to discharge fluid therein in a substantially tangential direction to the periphery of the wheel.

8. A geothermal fluid turbine rotor for use with a fluid including both water and steam, the turbine rotor including:
a water wheel having opposed walls and a row of reaction, supersonic nozzles at the periphery thereof, these nozzles discharging fluid therefrom in a direction substantially tangential to the periphery;
a conical element upstream of the water wheel;
a cooperating outer wall surrounding the conical element and defining a divergent passage to form a centrifuge, an extension of said outer wall forming one wall of the water wheel;
the other wall of the water wheel extending radially inward at a point downstream of the conical element such that water in the fluid is guided by said wall into the water wheel.

9. A turbine rotor as in claim 8 in which:
a concave wall surface, downstream of the conical element, and a cooperating wall surface surrounding the concave wall surface form a passage for diverting steam around said other wall of the water wheel and away from the water wheel.

10. A turbine rotor as in claim 9 including a steam wheel having opposed walls and a row of reaction supersonic nozzles between them at the periphery, and this wheel receives steam from said steam passage.

11. A turbine rotor as in claim 8 including:
a steam wheel having opposed walls and a row of reaction supersonic nozzles at the periphery, these nozzles discharging fluid substantially tangential to the wheel periphery; and
the centrifuge being located as to separate the water from the steam in the fluid and divert the steam into the steam wheel.

12. A turbine rotor as in claim 11 in which the other wall of the water wheel forms the outer wall of a steam passage to divert steam from the centrifuge away from the water wheel and into the steam wheel, the inner wall of the steam passage being a concave wall surface downstream of and concentric to the conical element.

13. A turbine rotor as in claim 8 in which the space between the walls of the water rotor, inwardly of the row of nozzles, is free of obstruction to the fluid flowing outwardly to the nozzles.

14. A turbine rotor as in claim 11 in which the space between the walls of at least one of the wheels is unobstructed, radially inward to the nozzles to allow radial flow of the fluid therein.

15. A turbine rotor as in claim 11 in which the space between the opposite walls of at least one of the wheels has guide vanes therein curved to assure a radial flow of fluid in the wheel without significant tangential acceleration.

* * * * *